(12) United States Patent
Narumi et al.

(10) Patent No.: US 6,490,520 B2
(45) Date of Patent: Dec. 3, 2002

(54) VEHICLE-MOUNTED INFORMATION PROCESSING DEVICE AND STORAGE MEDIUM

(75) Inventors: Shinya Narumi, Tokyo (JP); Akio Uekawa, Tokyo (JP); Hideharu Yasutake, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/725,144

(22) Filed: Nov. 29, 2000

(65) Prior Publication Data

US 2001/0002454 A1 May 31, 2001

(30) Foreign Application Priority Data

Nov. 30, 1999 (JP) ............................................ 11-340995

(51) Int. Cl.⁷ .................................................. G06F 7/00
(52) U.S. Cl. ......................................... 701/200; 701/36
(58) Field of Search .............................. 701/29, 32, 33, 701/35, 36, 200

(56) References Cited

U.S. PATENT DOCUMENTS 6,256,578 B1 * 7/2001 Ito .............................. 701/200

FOREIGN PATENT DOCUMENTS

JP           11-211489           6/1999

\* cited by examiner

*Primary Examiner*—William A. Cuchlinski, Jr.
*Assistant Examiner*—Edward Pipala
(74) *Attorney, Agent, or Firm*—Leydig, Voit & Mayer, Ltd.

(57) ABSTRACT

A vehicle-mounted information processing device includes a platform having vehicle-mounted hardware and one or more basic functions to control the hardware. An application processing unit performs processing using the one or more basic functions of the platform. When transferring information from the platform to the application processing unit, a single interface unit transfers the information in a constant data format. When transferring information from the application processing unit to the platform, the single interface unit transfers the information in a data format corresponding to the platform.

4 Claims, 6 Drawing Sheets

VEHICLE-MOUNTED INFORMATION PROCESSING DEVICE AND STORAGE MEDIUM

BACKGROUND OF THE INVENTION

1. Field of the Invention

The present invention relates to a vehicle-mounted information processing device for executing an application such as navigation functions, and a storage medium having embodied therein a computer program for making a machine function as the information processing device.

2. Description of the Prior Art

Figure 8:
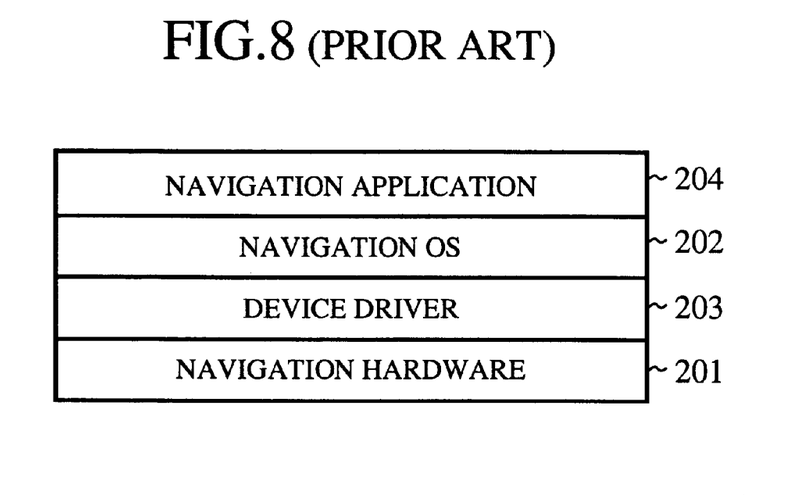
FIG. 8 is a diagram hierarchically showing the structure of a prior art vehicle-mounted information processing device.

FIG. 8 is a diagram hierarchically showing the structure of a prior art vehicle-mounted information processing device. In the figure, reference numeral 201 denotes navigation hardware including a remote controller, a CD (Compact Disc)-ROM drive, a display, a GPS (Global Positioning System) receiver, etc., numeral 202 denotes a navigation OS (operating system) having basic functions to control the navigation hardware 201, numeral 203 denotes device drivers for directly controlling the navigation hardware 201, and numeral 204 denotes a navigation application for implementing a navigation system. This prior art vehicle-mounted information processing device has a ROM for storing these programs, a microprocessor for executing them, etc.

In operation, in the prior art vehicle-mounted information processing device, the navigation application 204 is executed on the navigation OS 202, an event generated by each piece of navigation hardware 201 is processed properly, and the navigation system is implemented.

Thus, the prior art vehicle-mounted information processing device implements a navigation system. The navigation application 204 of the vehicle-mounted information processing device can be developed on a general-purpose OS installed in a personal computer; in other words, the navigation application 204 can be developed on a platform consisting of a personal computer and a general-purpose OS. The navigation application 204 is transplanted onto a platform consisting of the navigation hardware 201, the navigation OS 202, and the device drivers 203 after it has been completed.

When developing a navigation application 204 on a platform consisting of a personal computer and a general-purpose OS, and transplanting this on the platform consisting of the navigation hardware 201, the navigation OS 202, and the device drivers 203, it is necessary to modify the navigation application 204 since the transfer of various information between the navigation application 204 and the navigation OS 202 depends on a component of the platform, such as the navigation OS 202, and, therefore, the development of a navigation application 204 becomes complex.

Figure 9:
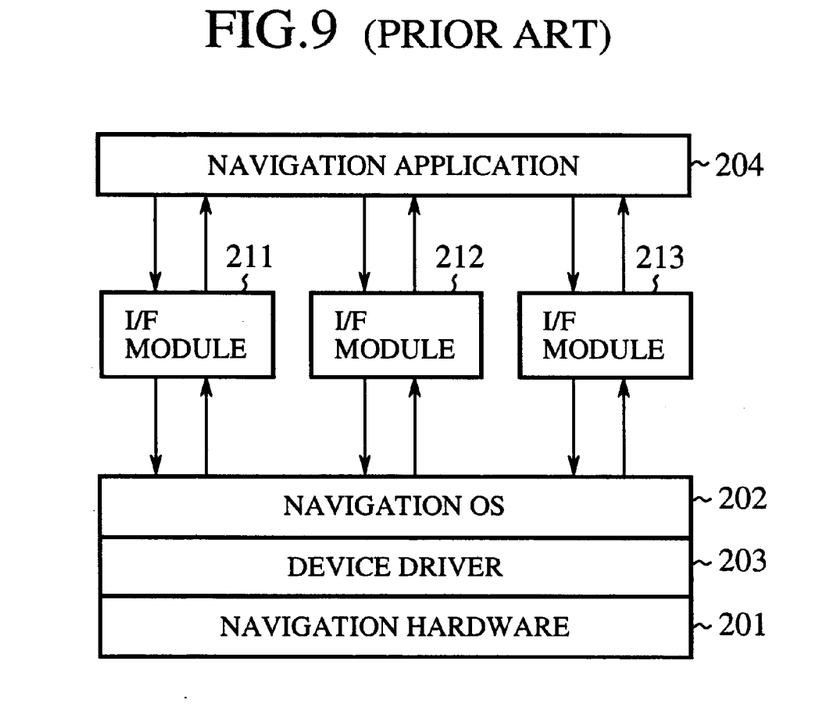
FIG. 9 is a diagram hierarchically showing the structure of another prior art vehicle-mounted information processing device.

A prior art technology that solves the problem is described in Japanese patent application publication No. 11-211489. FIG. 9 is a diagram hierarchically showing the structure of another prior art vehicle-mounted information processing device disclosed in Japanese patent application publication No. 11-211489. In the figure, reference numerals 211 to 213 respectively denote a plurality of interface modules each of which includes, for instance, Java™ Virtual Machine, Java basic API (Application Programming Interface), a navigation class library, and Java extension API, the plurality of interface modules being provided for a plurality of services, respectively. The explanation of other components will be omitted hereafter since those components are the same as those shown in FIG. 8.

In operation, in the prior art vehicle-mounted information processing device, the plurality of interface modules 211 to 213 each of which includes, for instance, Java Virtual Machine, Java basic API, a navigation class library, and Java extension API operate on the navigation OS 202, and the navigation application 204 operates on the plurality of interface modules 211 to 213. At this time, for each service provided by the navigation application 204, a corresponding one of the plurality of interface modules 211 to 213 performs transfer of predetermined information between the navigation OS 202 and the navigation application 204.

Thus, the navigation application 204 can operate on the plurality of interface modules 211 to 213, each of which consists of Java Virtual Machine etc. in the prior art vehicle-mounted information processing device constructed as shown in FIG. 9. Accordingly, the same navigation application 204 can be made to operate on different platforms.

A problem with a prior art vehicle-mounted information processing device constructed as above is that since an interface module is provided for each service, a plurality of event waitings occur in a navigation application and it therefore becomes necessary to make processes synchronize with each other in the navigation application, and, as a result, the structure of the navigation application and hence the development of the navigation application becomes complex.

SUMMARY OF THE INVENTION

The present invention is proposed to solve the above-mentioned problems, it is therefore an object of the present invention to provide a vehicle-mounted information processing device capable of, when transferring information from a platform to a navigation application, transferring it in a constant data format to all services provided by the navigation application, and, when transferring information from the navigation application to the platform, transferring it in a certain data format corresponding to the platform, by using a single interface means, and a storage medium having embodied thereon a computer program for making a machine function as the information processing device, thereby simplifying the structure of the navigation application and providing easy development of navigation applications.

In accordance with an aspect of the present invention, there is provided a vehicle-mounted information processing device comprising: a platform having vehicle-mounted hardware and one or more basic functions to control the hardware; an application processing unit for performing a predetermined processing by using the one or more basic functions of the platform; and a single interface unit for, when transferring information from the platform to the application processing unit, transferring it in a constant data format, and for, when transferring information from the application processing unit to the platform, transferring it in a certain data format corresponding to the platform.

In accordance with a preferred embodiment of the present invention, each of the single interface unit and the application processing unit includes a common interface unit for transferring information in a constant data format.

In accordance with another preferred embodiment of the present invention, the single interface unit includes a hardware monitor unit for monitoring each of a plurality of pieces of hardware included in the vehicle-mounted hardware, an event generation unit for generating a platform-independent event corresponding to an event generated in any one of the plurality of pieces of hardware detected by the hardware monitor unit, and an event transmission unit for transmitting the platform-independent event generated by the event generation unit to the application processing unit.

Preferably, when the hardware monitor unit detects two or more events, the event generation unit generates two or more platform-independent events from the events one by one based on predetermined priorities assigned to the detected events.

In accordance with a further aspect of the present invention, there is provided a computer readable storage medium having embodied thereon a computer program, the computer program making a machine function as: an application processing unit for performing a predetermined processing by using one or more basic functions of a platform having vehicle-mounted hardware; and a single interface unit for, when transferring information from the platform to the application processing unit, transferring it in a constant data format, and for, when transferring information from the application processing unit to the platform, transferring it in a certain data format corresponding to the platform.

Further objects and advantages of the present invention will be apparent from the following description of the preferred embodiments of the invention as illustrated in the accompanying drawings.

DETAILED DESCRIPTION OF THE PREFERRED EMBODIMENTS

Embodiment 1

Figure 1:
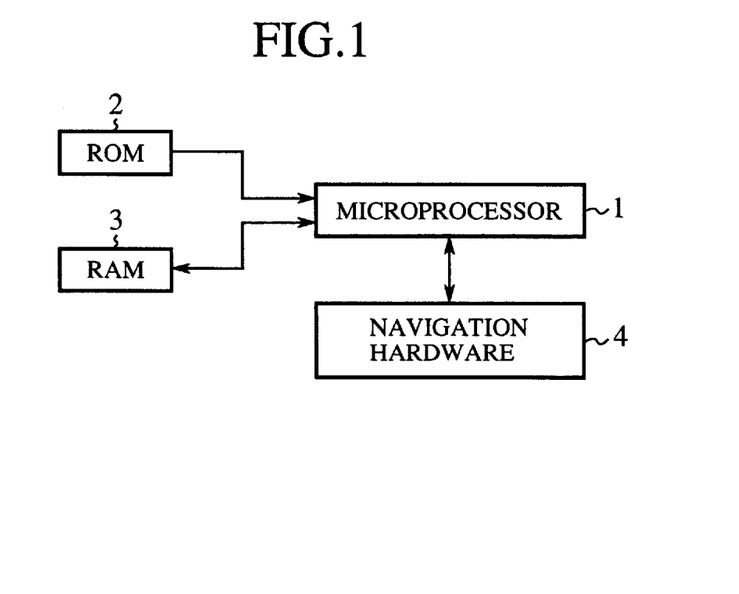
FIG. 1 is a block diagram showing the hardware configuration of a vehicle-mounted information processing device according to a first embodiment of the present invention.

FIG. 1 is a block diagram showing the hardware configuration of a vehicle-mounted information processing device according to a first embodiment of the present invention. In the figure, reference numeral 1 denotes a microprocessor for executing such programs as a navigation OS, device drivers, a platform-dependent interface module, and a navigation application, numeral 2 denotes a ROM for storing the programs such as the navigation OS, the device drivers, the platform-dependent interface module, and the navigation application, numeral 3 denotes a RAM for temporarily storing a program, such as the navigation OS, a device driver, the platform-dependent module, or the navigation application, and data during execution of the program, and numeral 4 denotes navigation hardware including a remote controller, a CD-ROM (or DVD (Digital Versatile Disc)-ROM) drive, a display, a GPS receiver, etc.

It is possible to record the navigation OS, the device drivers, the platform-dependent interface module, and the navigation application, etc. in a storage medium such as a CD instead of the ROM 2, and to read and to use those programs with a CD-ROM drive. As an alternative, it is possible to store only the navigation OS and the device drivers in the ROM 2, to record the platform-dependent interface module and the navigation application in a storage medium such as a CD, and to read and to use them with a CD-ROM drive.

Figure 2:
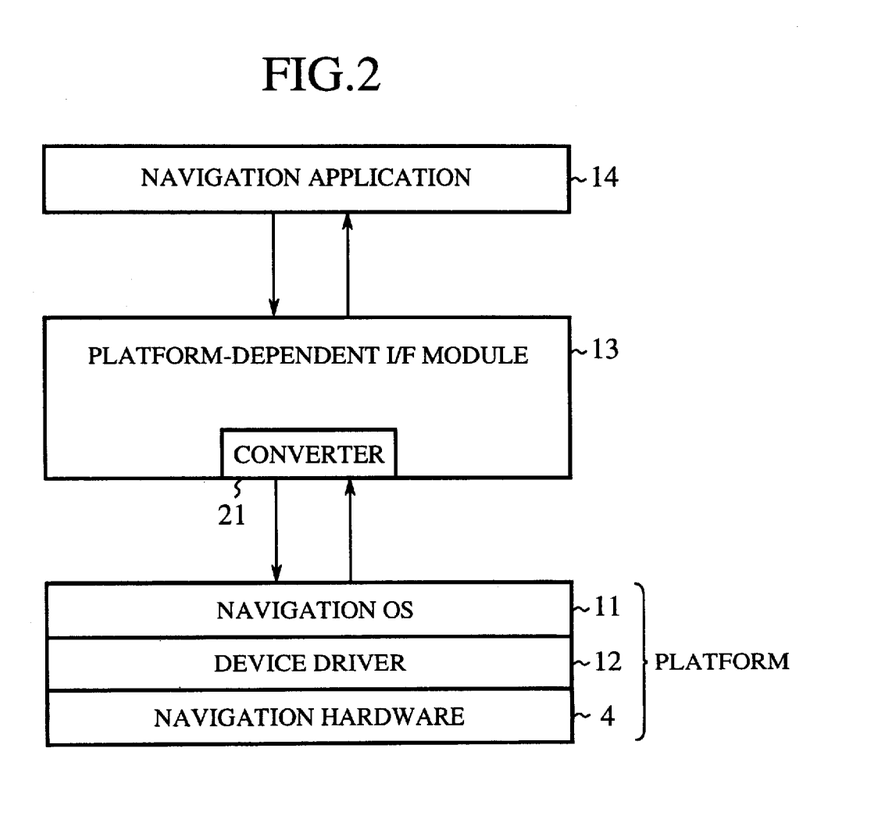
FIG. 2 is a diagram hierarchically showing the structure of the vehicle-mounted information processing device according to the first embodiment of the present invention.

FIG. 2 is a diagram hierarchically showing the structure of the vehicle-mounted information processing device according to the first embodiment of the present invention. In the figure, reference numeral 4 denotes the above-mentioned navigation hardware, numeral 11 denotes the navigation OS having basic functions to control the navigation hardware 4, and numeral 12 denotes the device drivers to directly control the navigation hardware 4. A platform consists of the navigation hardware 4, the navigation OS 11, and the device drivers 12.

Reference numeral 13 denotes a platform-dependent interface module for, when transferring predetermined information from the platform to the navigation application 14, transferring it in a constant data format to all services provided by the navigation application 14, and, when transferring predetermined information from the navigation application 14 to the platform, transferring it in a certain data format corresponding to the platform from the navigation application 14 to the platform. The navigation application 14 implements a navigation system. Reference numeral 21 denotes a converter located in the platform-dependent interface module 13, for converting data from the platform into data in the constant data format which does not depend on the platform (i.e., a platform-independent event).

In operation, the single platform-dependent interface module 13 as shown in FIG. 2 operates on the navigation OS 11, and the navigation application 14 operates on the platform-dependent interface module 13. The single platform-dependent interface module 13 receives data from each piece of navigation hardware 4, such as the remote controller, by way of the device driver 12 etc., and the converter 21 converts the data into data in the constant data format, and supplies the data with an identifier identifying the piece of the navigation hardware 4 which has output the data to the navigation application 14.

The navigation application 14 stands by until data and an identifier from the single platform-dependent interface module 13 are supplied thereto,-and then performs a service corresponding to the data and the identifier received by using the basic functions of the platform when it receives the data and the identifier.

The navigation application 14 can be developed on a platform such as a personal computer on which a general-purpose OS runs. The navigation application 14 is then transplanted on the platform consists of the navigation hardware 4, the navigation OS 11, and the device drivers 12 after it has been completed. When transplanting the navigation application 14 onto another platform, i.e., when switching from a platform on which the navigation application 14 has been developed to another platform in which the navigation application 14 is actually used, all that is needed is to change the platform-dependent interface module 13 from the one for development to the one for mounting, and there is hardly a necessity for changing the navigation application 14.

As mentioned above, according to the first embodiment, the vehicle-mounted information processing device can, when transferring predetermined information from the platform to the navigation application 14, transfer it in a constant data format to all services provided by the navigation application 14, and, when transferring predetermined information from the navigation application 14 to the platform, transfer it in a certain data format corresponding to the platform from the navigation application 14 to the platform, by using the single platform-dependent interface module 13, thereby simplifying the structure of the navigation application 14, and therefore facilitating the development of the navigation application 14. In addition, the present embodiment offers another advantage of being able to easily change the platform.

Embodiment 2

Figure 3:
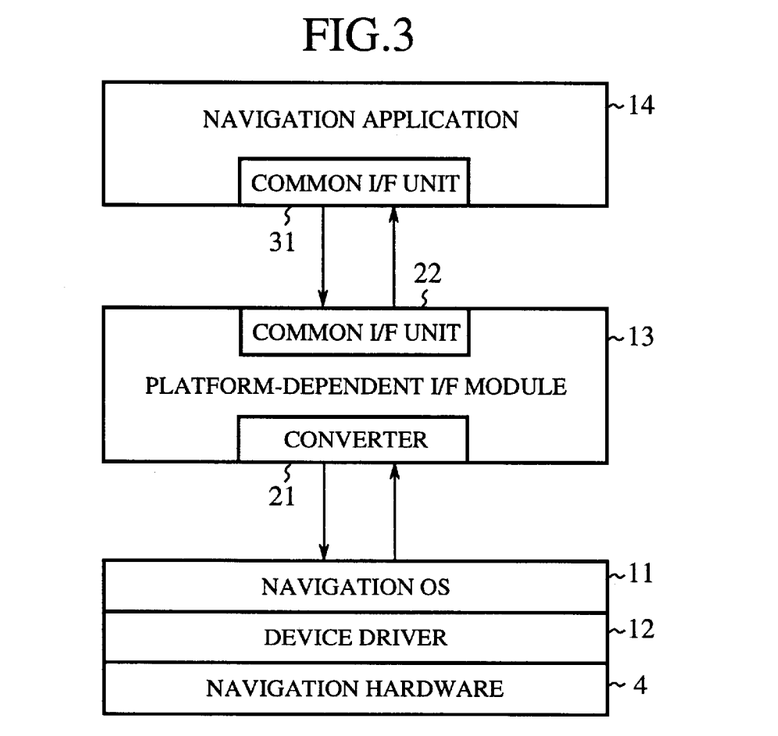
FIG. 3 is a diagram hierarchically showing the structure of a vehicle-mounted information processing device according to a second embodiment of the present invention.

FIG. 3 is a diagram hierarchically showing the structure of a vehicle-mounted information processing device according to a second embodiment of the present invention. In the figure, reference numerals 22 and 31 denote common interface units disposed in a navigation application 14 and a platform-dependent interface module 13, respectively, for transferring information in a constant data format. The explanation of other components will be omitted hereafter since those components are the same as those shown in FIG. 2 according to the above-mentioned first embodiment. Furthermore, since the hardware configuration of the vehicle-mounted information processing device according to the second embodiment is the same as that according to the above-mentioned first embodiment, the explanation will be omitted hereafter.

In operation, in the vehicle-mounted information processing device according to the second embodiment, the transfer of information between the platform-dependent interface module 13 and the navigation application 14 is performed in the constant data format by the common interface units 22 and 31. The explanation of other operations will be omitted hereafter since those components are the same as those according to the above-mentioned first embodiment.

As mentioned above, according to the second embodiment, since the vehicle-mounted information processing device performs the transfer of information between the platform-dependent interface module 13 and the navigation application 14 in a constant data format by using the common interface units 22 and 31, the navigation application which has the majority of the program becomes more platform-independent and therefore all that is needed to transplant the navigation application 14 onto another platform is to change only part of the platform-dependent interface module 13 other than the common interface unit 22. Accordingly, the second embodiment offers an advantage of being able to easily transplant the navigation application onto a plurality of kinds of platforms.

Embodiment 3

Figure 4:
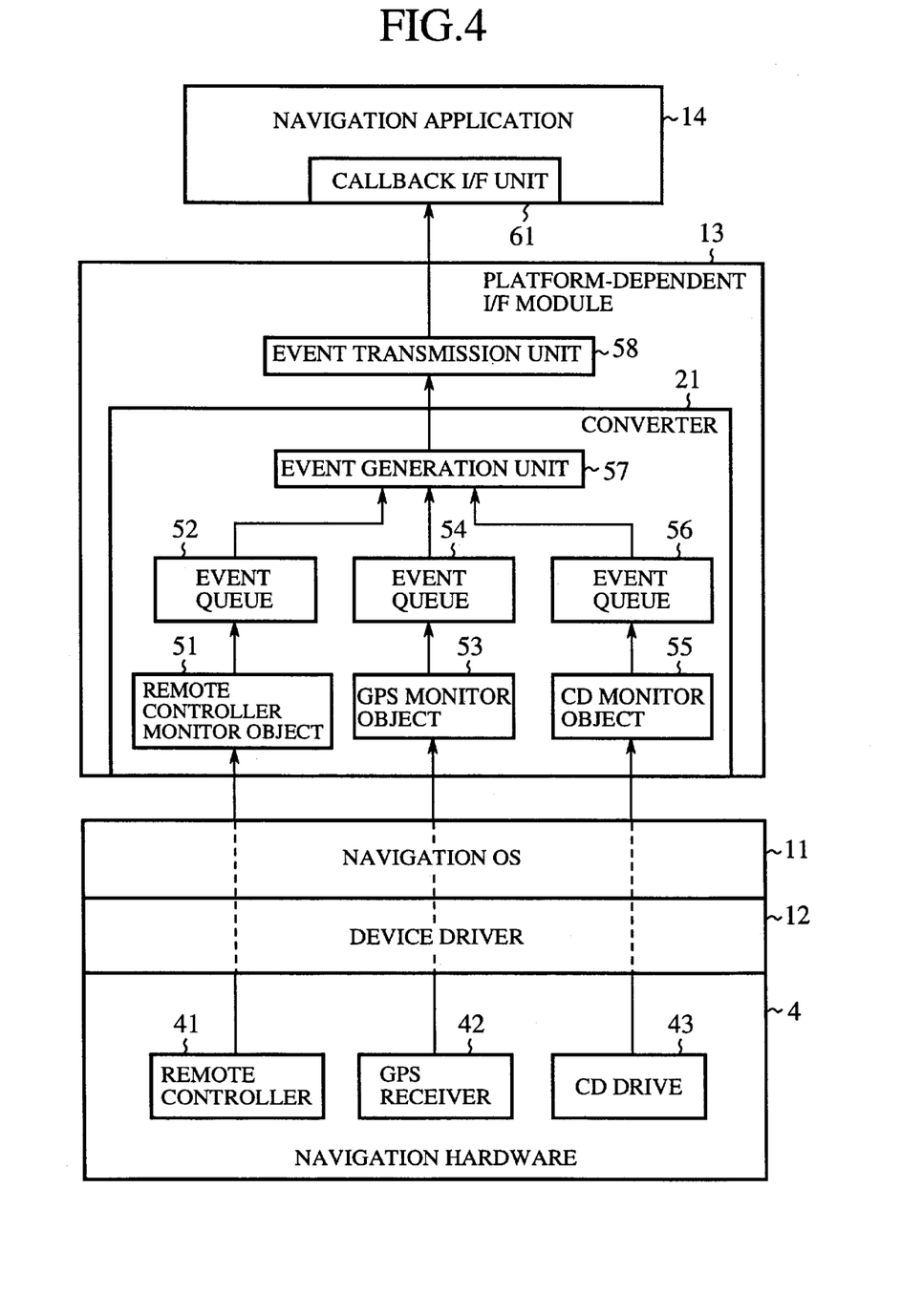
FIG. 4 is a diagram hierarchically showing the structure of a vehicle-mounted information processing device according to a third embodiment of the present invention.

FIG. 4 is a diagram hierarchically showing the structure of a vehicle-mounted information processing device according to a third embodiment of the present invention. In the figure, reference numeral 41 denotes a remote controller disposed as a piece of navigation hardware 4, numeral 42 denotes a GPS receiver disposed as a piece of the navigation hardware 4, and numeral 43 denotes a CD drive disposed as a piece of the navigation hardware 4.

Reference numeral 51 denotes a remote control monitor object for monitoring the remote controller 41, and numeral 52 denotes an event queue for holding one or more events issued by the remote control monitor object 51, numeral 53 denotes a GPS monitor object for monitoring the GPS receiver 42, and numeral 54 denotes an event queue for holding one or more events issued by the GPS monitor object 53, numeral 55 denotes a CD monitor object for monitoring the CD drive 43, and numeral 56 denotes an event queue for holding one or more events issued by the CD monitor object 55.

Reference numeral 57 denotes an event generation unit for, when an event is held in any one of the event queues 52, 54, and 56, generating a platform-independent event in a constant data format, which corresponds to the kind of the piece of navigation hardware 4 which has generated the event and the contents of the event, numeral 58 denotes an event transmission unit for supplying a platform-independent event generated by the event generation unit 57 to the navigation application 14, and numeral 61 denotes a callback interface unit for causing the navigation application 14 to process a platform-independent event from the event transmission unit so as to perform a service (i.e., an application program) corresponding to the platform-independent event.

Since the hardware configuration of the vehicle-mounted information processing device according to the third embodiment is the same as that according to the above-mentioned first embodiment, the explanation will be omitted hereafter.

In operation, when an event is generated based on an operation or the like performed by the user in the remote controller 41, the remote control monitor object 51 registers the event in the event queue 52. Furthermore, when an event is generated in the GPS receiver 42, the GPS monitor object 53 registers the event in the event queue 54, and when an event is generated in the CD drive 43, the CD monitor object 55 registers the event in the event queue 56. These events held by the plurality of event queues 52, 54, and 56 depend on the platform. Although two or more events can be registered in each of the plurality of event queues 52, 54, and 56, two identical events cannot be registered in each of the plurality of event queues 52, 54, and 56. When an event generated is identical to the one already registered in a corresponding one of the plurality of event queues 52, 54, and 56, the event cannot be held by the corresponding event-queue.

When an event is registered in a corresponding one of the plurality of event queues 52, 54 and 56, the event generation unit 57 reads it and generates a platform-independent event in a constant data format, which corresponds to the kind of the piece of navigation hardware 4 which has generated the event and the contents of the event. The event transmission unit 58 supplies the platform-independent event to the callback interface unit 61 of the navigation application 14. For example, the data format of this platform-independent event can be defined as "OriginalEvent(EventID,data);". Here, "EventID" is an identifier identifying the piece of navigation hardware 4 which has generated the event, and "data" is data on the event, which can be described in a certain form which does not depend on the platform.

The callback interface part 61 causes the navigation application 14 to process the platform-independent event so as to perform a service corresponding to the platform-independent event. Thus, a platform-independent event generated by the event generation unit 57 is supplied to the navigation application 14 by the platform-dependent interface module 13, and a service corresponding to an event generated by a piece of navigation hardware 4 is therefore performed by the navigation application 14.

Figure 5:
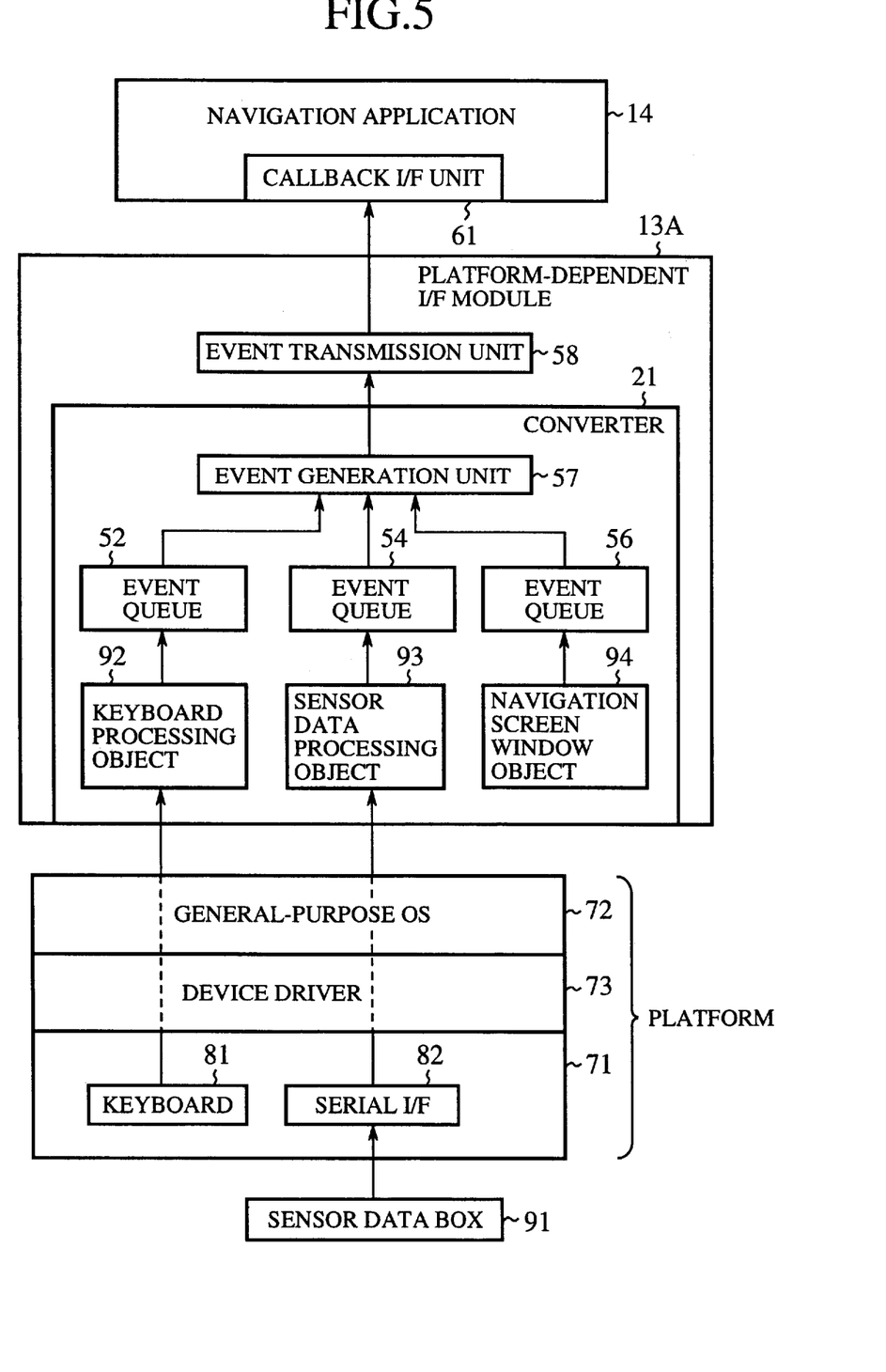
FIG. 5 is a diagram hierarchically showing the vehicle-mounted information processing device according to the third embodiment of the present invention in development of a navigation application.
Figure 6:
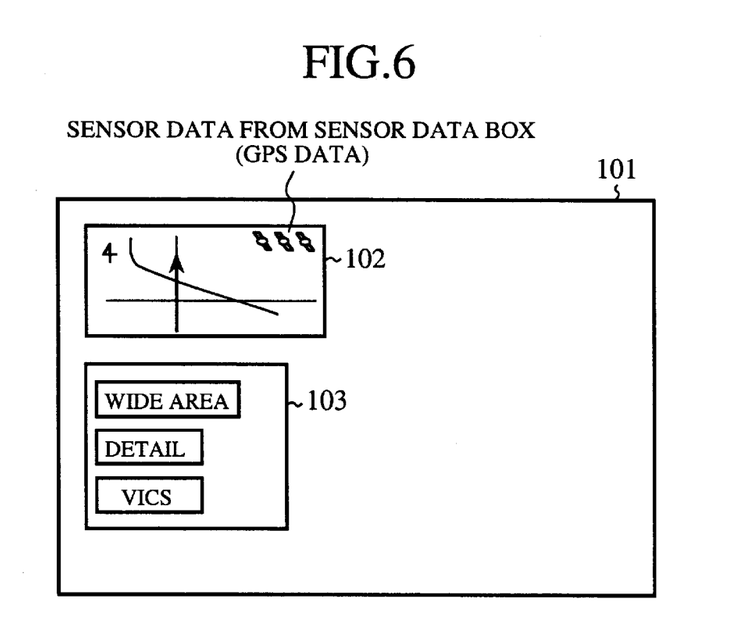
FIG. 6 is a diagram showing one example of a display image in development of a navigation application.

Next, the development of a navigation application 14 will be explained. FIG. 5 is a diagram hierarchically showing the structure of the device under development of a navigation application, and FIG. 6 is a diagram showing one example of a display image under development of a navigation application. In the development phase, a personal computer 71 on which a general-purpose OS 72, such as Windows NT™, and various device drivers 73 operate is used as a platform, as shown in FIG. 5. The remote controller and various switches included in the navigation hardware 4 of FIG. 4 are imitated by a keyboard 81, and the GPS receiver etc. included in the navigation hardware 4 are imitated by a sensor data box 91 connected, by way of a serial interface 82, such as RS232C, with the personal computer 71. The sensor data box 91 can imitate GPS data and car speed data, and output them to the computer via the serial interface.

In the case of use of such the platform for development, a platform-dependent interface module 13A for development is used. In the platform-dependent interface module 13A for development, a keyboard processing object 92, a sensor data processing object 93, and a navigation screen window object 94 are provided instead of the remote control monitor object 51, the GPS monitor object 53, and the CD monitor object 55 shown in FIG. 4. The objects 92 and 93 can generate events based on an event generated by the keyboard 81 and sensor data supplied by the sensor data box 91 by way of the serial interface 82, respectively.

The navigation screen window object 94 can display a window 102 for a navigation image and a window 103 including a dialog, keys, a panel, etc. on a display 101 attached to the personal computer 71 by generating an event of display, as shown in FIG. 6. Basic functions, such as a window function and a dialog function, of the general-purpose OS 72 are used for the display of a window and a dialog.

The event generation unit 57 generates a platform-independent event from an event generated based on either an event generated by the keyboard 81 or sensor data supplied by the sensor data box 91 by way of the serial interface 82. The event transmission unit 58 then supplies the platform-independent event to the navigation application 14, and the navigation application 14 performs a service corresponding to the event generated by the keyboard 81 or the like. As a result, a navigation image based on the sensor data supplied by the sensor data box 91 can be displayed in the window 102 for example.

As mentioned above, according to the third embodiment, the navigation application only has to stand by until a platform-independent event is supplied from the platform-dependent interface module 13 to the navigation application 14, and perform a service corresponding to the supplied platform-independent event at any time. Accordingly, data formats of information supplied to the navigation application are unified, the debugging work in the development phase of the navigation application can be simplified, and therefore the development efficiency can be improved.

Furthermore, since it is easy to obtain a developer tool which operates on personal computers and there are very few developer tools which operate in a real machine, decrease in the number of parts which should be developed on a real machine can improve the development efficiency.

Embodiment 4

Figure 7:
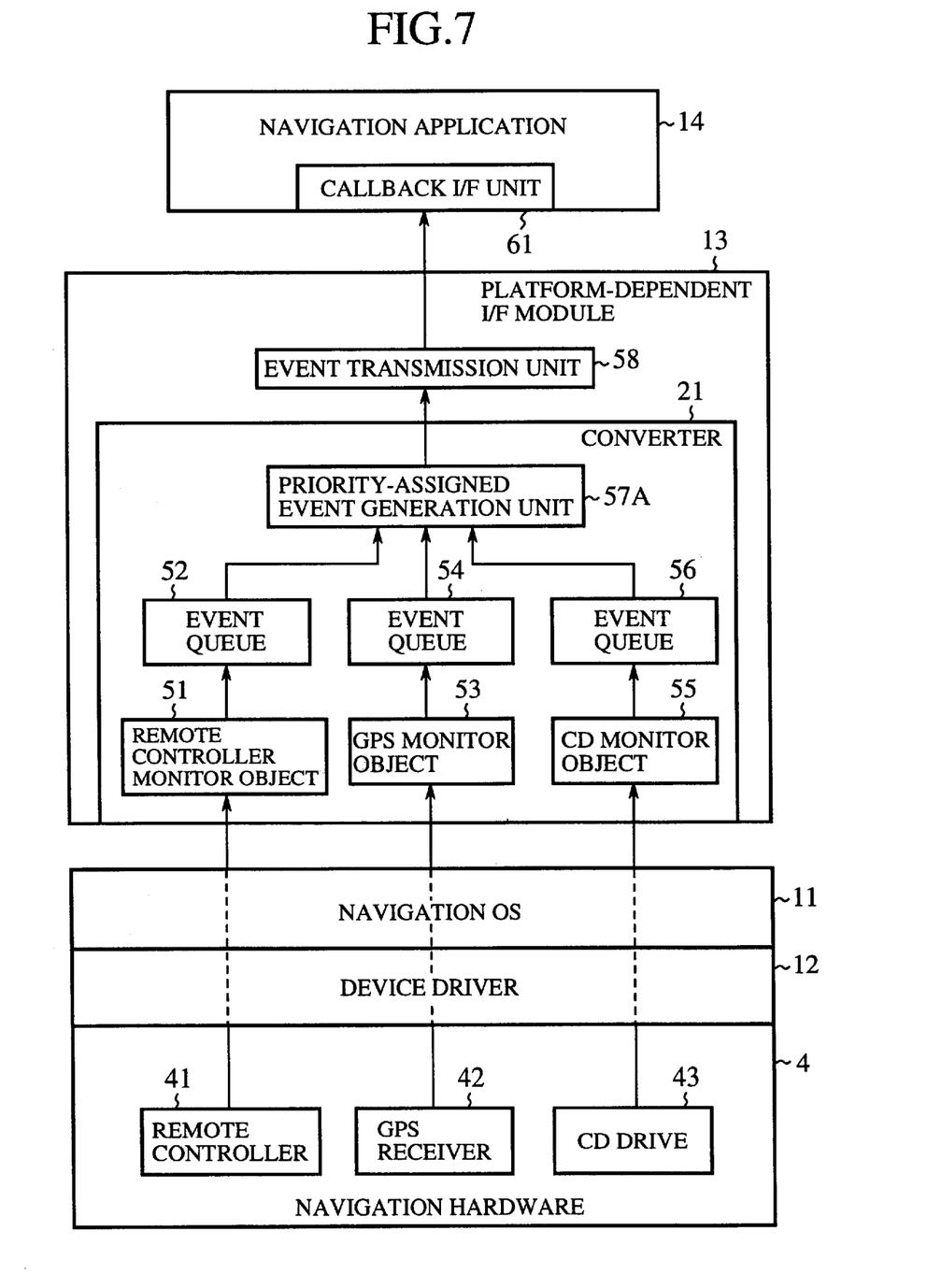
FIG. 7 is a diagram hierarchically showing the structure of a vehicle-mounted information processing device according to a fourth embodiment of the present invention.

FIG. 7 is a diagram hierarchically showing the structure of a vehicle-mounted information processing device according to a fourth embodiment of the present invention. In the figure, reference numeral 57A denotes a priority-assigned event generation unit for, when events are held by a plurality of event queues 52, 54, and 56, respectively, sequentially generating a plurality of platform-independent events in a constant data format, which respectively correspond to the kinds of the pieces of navigation hardware 4 which have generated the events and the contents of the events, in order of priorities assigned to the events. These priorities are preset based on the importance degree of a service to be performed according to each event and the load imposed on the device when the service is performed. The explanation of other components will be omitted hereafter since those components are the same as those shown in FIG. 4 according to the above-mentioned third embodiment.

Furthermore, since the hardware configuration of the vehicle-mounted information processing device according to the fourth embodiment is the same as that according to the above-mentioned first embodiment, the explanation will be omitted hereafter.

In operation, when events are held by the plurality of event queues 52, 54, and 56, respectively, the priority-assigned event generation unit 57A generates a plurality of platform-independent events in a constant data format, which respectively correspond to the kinds of pieces of navigation hardware 4 which have generated the events and the contents of the events, one by one in order of the priorities assigned to the events. The explanation of other operations will be omitted since the operations are the same as those according to the above-mentioned third embodiment.

As mentioned above, according to the fourth embodiment, the priority-assigned event generation unit 57A generates a plurality of platform-independent events from events generated by the navigation hardware 4 one by one in order of the priorities assigned to the events. Accordingly, the fourth embodiment offers an advantage of being able to flexibly process events generated by the navigation hardware one by one in more appropriate order, thereby improving the performance of the device.

Many widely different embodiments of the present invention may be constructed without departing from the spirit and scope of the present invention. It should be understood that the present invention is not limited to the specific embodiments described in the specification, except as defined in the appended claims.

What is claimed is:

1. A vehicle-mounted information processing device comprising:

a platform having vehicle-mounted information processing device hardware and at least a navigation operating system for controlling said information processing device hardware;

application processing means for processing using the navigation operating system of said platform; and single interface means for, when transferring information from said platform to said application processing means, transferring the information in a constant data format, and for, when transferring information from said application processing means to said platform, transferring the information in a data format corresponding to the platform, said single interface means including hardware monitor means for monitoring each of a plurality of pieces of hardware included in said vehicle-mounted hardware, event generation means for generating a platform-independent event corresponding to an event generated in any one of the plurality of pieces of hardware detected by said hardware monitor means, and event transmission means for transmitting the platform-independent event generated by said event generation means to said application processing means.

2. The vehicle-mounted information processing device according to claim 1, wherein each of said single interface means and said application processing means includes a common interface means for transferring information in the constant data format.

3. The vehicle-mounted information processing device according to claim 1, wherein, when said hardware monitor means detects at least two events, said event generation means generates at least two platform-independent events from the events, one-by-one, based on priorities assigned to the detected events.

4. A computer readable storage medium having therein a computer program, said computer program making a machine function as:

application processing means for processing using a navigation operating system of a platform having vehicle-mounted information processing device hardware; and single interface means for, when transferring information from said platform to said application processing means, transferring the information in a constant data format, and for, when transferring information from said application processing means to said platform, transferring the information in a data format corresponding to the platform.

* * * * *